United States Patent
Al Hamami

(10) Patent No.: US 10,623,440 B2
(45) Date of Patent: Apr. 14, 2020

(54) METHOD AND SYSTEM FOR PROTECTING WEB APPLICATIONS AGAINST WEB ATTACKS

(71) Applicant: Trend Micro Incorporated, Tokyo (JP)

(72) Inventor: Ahmad Zaid Al Hamami, Brossard (CA)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 15/899,937

(22) Filed: Feb. 20, 2018

(65) Prior Publication Data
US 2018/0189052 A1 Jul. 5, 2018

Related U.S. Application Data

(63) Continuation of application No. 14/461,021, filed on Aug. 15, 2014, now abandoned.

(60) Provisional application No. 61/866,191, filed on Aug. 15, 2013.

(51) Int. Cl.
| | |
|---|---|
| H04L 29/06 | (2006.01) |
| H04L 29/08 | (2006.01) |
| G06F 21/55 | (2013.01) |
| G06F 21/54 | (2013.01) |

(Continued)

(52) U.S. Cl.
CPC ............ *H04L 63/1466* (2013.01); *G06F 8/65* (2013.01); *G06F 21/53* (2013.01); *G06F 21/54* (2013.01); *G06F 21/552* (2013.01); *G06F 21/554* (2013.01); *H04L 67/02* (2013.01); *H04L 67/1002* (2013.01); *H04L 67/34* (2013.01); *H04L 63/20* (2013.01)

(58) Field of Classification Search
CPC ... H04L 63/1466; G06F 21/54; G06F 21/552; G06F 21/554
See application file for complete search history.

(56) References Cited

U.S. PATENT DOCUMENTS

| | | | |
|---|---|---|---|
| 8,527,860 B1 * | 9/2013 | Colton | G06F 16/972 715/205 |
| 8,839,441 B2 * | 9/2014 | Saxena | G06F 21/577 726/25 |

(Continued)

OTHER PUBLICATIONS

Pinzon, Cristian; De Paz, Juan F.; Bajo, Javier; Herrero, Alvaro; Corchado, Emilio; "AIIDA-SQL: An Adaptive Intelligent Intrusion Detection Agent for Detecting SQL Injection Attacks", 10th International Conference on Hybrid Intelligent Systems, IEEE, Aug. 23-25, 2010, pp. 73-78.*

(Continued)

*Primary Examiner* — Victor Lesniewski
(74) *Attorney, Agent, or Firm* — Okamoto & Benedicto LLP

(57) ABSTRACT

The present disclosure provided a method and system for protecting web applications against web attacks comprising a cloud service for generating rules and receiving reports, an agent manager in communication with the cloud service receiving rules from the cloud service and passing reports thereto, and an in-application agent in communication with the agent manager for receiving rules therefrom and passing reports thereto for protecting an application in which the in-application agent is embedded.

17 Claims, 5 Drawing Sheets

(51) Int. Cl.
*G06F 21/53* (2013.01)
*G06F 8/65* (2018.01)

(56) References Cited

U.S. PATENT DOCUMENTS

| | | | | |
|---|---|---|---|---|
| 8,844,043 B2* | 9/2014 | Williams | ............... | G06F 21/577 713/189 |
| 2003/0023857 A1* | 1/2003 | Hinchliffe | ............... | G06F 21/56 713/188 |
| 2005/0273861 A1* | 12/2005 | Chess | ................. | G06F 21/54 726/25 |
| 2006/0277539 A1* | 12/2006 | Amarasinghe | .......... | G06F 21/53 717/168 |
| 2006/0277606 A1* | 12/2006 | Yunus | .................... | G06F 21/51 726/25 |
| 2008/0209451 A1* | 8/2008 | Michels | ................. | G06F 9/54 719/328 |
| 2009/0044271 A1* | 2/2009 | Benameur | ............... | G06F 21/31 726/22 |
| 2009/0089629 A1* | 4/2009 | Hawkins | ............. | G06F 11/0709 714/100 |
| 2009/0288165 A1* | 11/2009 | Qiu | ....................... | G06F 21/552 726/23 |
| 2011/0099482 A1* | 4/2011 | Koved | .................. | G06F 21/604 715/741 |
| 2011/0277026 A1* | 11/2011 | Agarwal | ................. | G06F 21/41 726/8 |
| 2011/0277027 A1* | 11/2011 | Hayton | ............... | H04L 63/0815 726/8 |
| 2012/0260344 A1* | 10/2012 | Maor | .................. | G06F 11/3688 726/25 |
| 2012/0304299 A1* | 11/2012 | Kelekar | ............. | H04L 63/1408 726/25 |
| 2013/0019314 A1* | 1/2013 | Ji | ........................... | H04L 67/02 726/25 |
| 2013/0125143 A1* | 5/2013 | Kikuchi | ............. | G06F 11/3438 719/318 |
| 2013/0318396 A1* | 11/2013 | Plate | .................. | G06F 11/3612 714/25 |
| 2014/0189875 A1* | 7/2014 | Beskrovny | .......... | H04L 63/1433 726/25 |
| 2014/0201838 A1* | 7/2014 | Varsanyi | ............... | G06F 21/552 726/23 |
| 2014/0215343 A1* | 7/2014 | Ligman | .................. | H04L 67/22 715/736 |
| 2014/0215344 A1* | 7/2014 | Ligman | .................. | H04L 67/22 715/736 |
| 2014/0215444 A1* | 7/2014 | Voccio | ................ | G06F 11/3636 717/128 |
| 2014/0282464 A1* | 9/2014 | El-Gillani | ................. | G06F 8/61 717/168 |
| 2014/0289391 A1* | 9/2014 | Balaji | .................... | H04L 43/04 709/224 |
| 2014/0359588 A1* | 12/2014 | O'Boyle | ................ | G06F 8/427 717/143 |
| 2015/0033341 A1* | 1/2015 | Schmidtler | ......... | H04L 63/1425 726/23 |
| 2015/0039764 A1* | 2/2015 | Beloglazov | ............. | H04L 47/70 709/226 |
| 2016/0119344 A1* | 4/2016 | Freitas Fortuna dos Santos | ........ | H04L 63/1466 726/7 |

OTHER PUBLICATIONS

Nascimento, Gustavo; Correia, Miguel; "Anomaly-based Intrusion Detection in Software as a Service", 41st International Conference on Dependable Systems and Networks Workshops (DSN-W), IEEE, Jun. 27-30, 2011, pp. 19-24.*

* cited by examiner

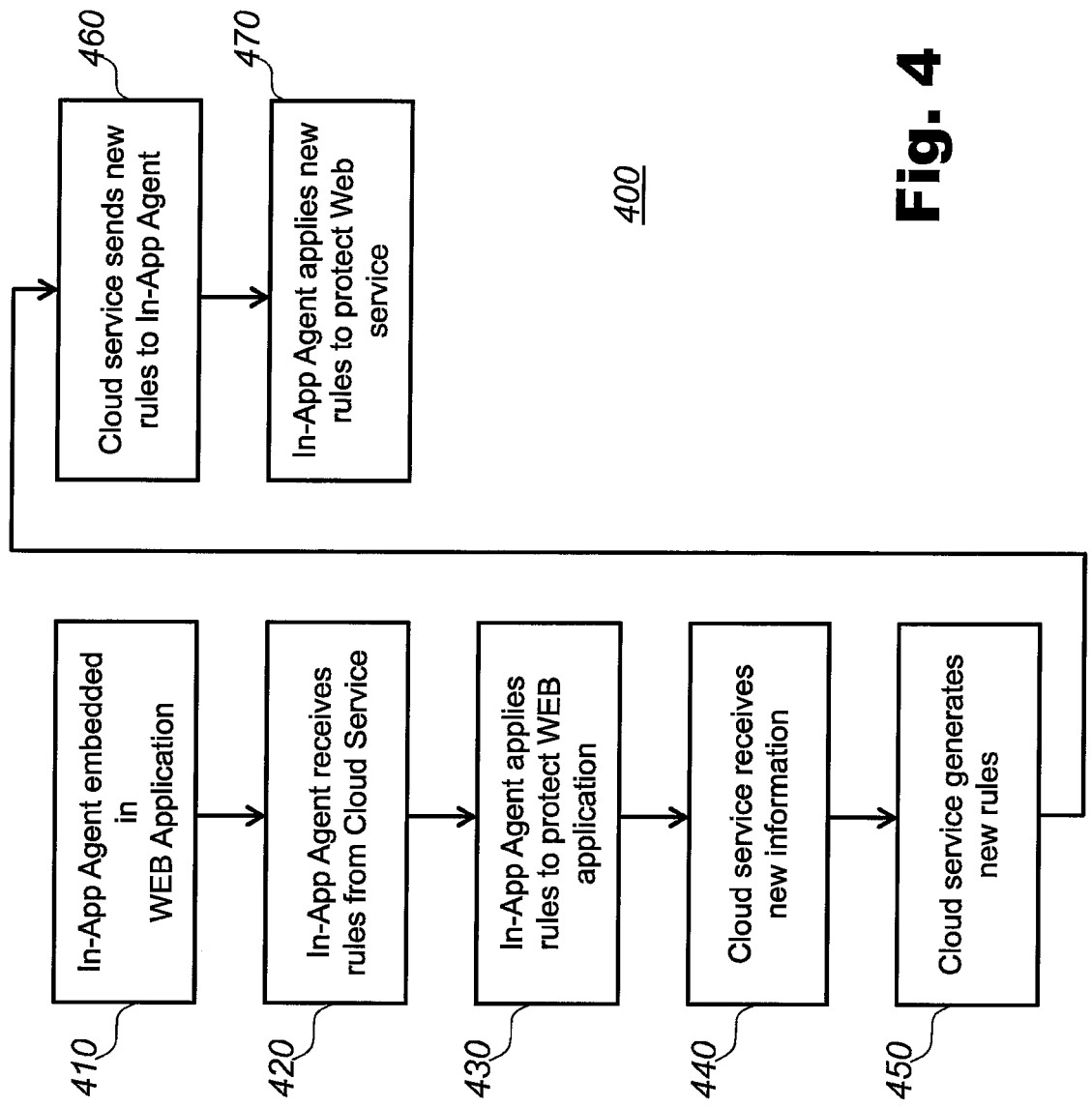

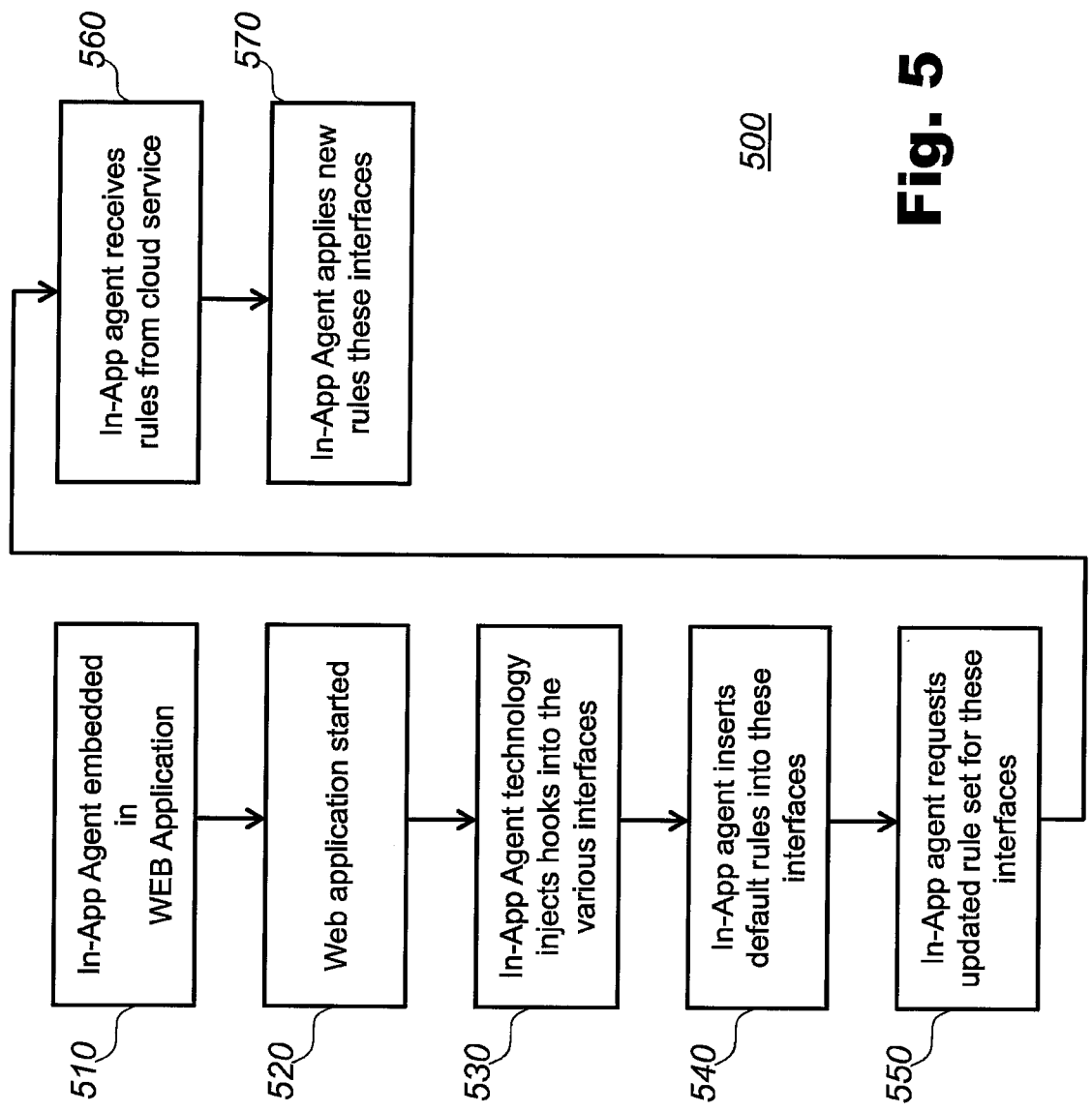

METHOD AND SYSTEM FOR PROTECTING WEB APPLICATIONS AGAINST WEB ATTACKS

CROSS REFERENCE TO RELATED APPLICATIONS

This application is a continuation application of U.S. patent application Ser. No. 14/461,021, filed Aug. 15, 2014, the disclosure of which is hereby incorporated by reference. U.S. patent application Ser. No. 14/461,021 claims the benefit of U.S. Provisional Patent Application 61/866,191 filed Aug. 15, 2013.

TECHNICAL FIELD

The present invention relates to methods and systems for protecting web applications against web attacks and is particularly concerned with using dynamic and in-application components.

BACKGROUND

Web application attacks remain a major attack vector in cyber threats. Technology has matured to detect and prevent network and server level attacks, mainly through vulnerability management and firewall technologies, however, web application protection technologies have not matured as much. While there are a plethora of source-code scanning and black-box penetration testing products and services, they may fail to detect and stop an attack occurring in real time.

Web application firewalls (WAF) are a particular type of network devices that provide a lot of functionality to detect and prevent common web application attacks. However, WAF's have a number of limitations that have hampered their adoption and they are known to be not very effective against targeted, sophisticated attacks.

An alternative class of solution is emerging, classified by some as "runtime application self-protection" (RASP). With RASPs some of the security functions of the WAF are moved into the application or runtime itself. Consequently, the application or runtime itself becomes the security perimeter.

The RASP technologies work mainly by instrumenting code via the runtime's instrumentation API (Java, .NET). RASPs allow for the detection of certain types of attacks. RASPs require certain features and APIs in the actual runtime to allow for the required code insertion, which is typically binary.

The systems and methods disclosed herein protect web applications against web attacks to obviate or mitigate at least some of the aforementioned disadvantages.

SUMMARY

In general, the present invention provides an improved method and system for protecting web applications against web attacks.

In the present disclosure there is provided a method and system for an agent library to be included into an application, either by the developer or at runtime by the runtime environment. The agent library is able to hook into various interfaces between the application and the different components in the environment.

Such interfaces include, but are not limited to datastores (SQL/NoSQL/XML as well as other types of databases), caching services, other services exposed via an API mechanism, the application runtime environment, included application libraries, as well as other services that are components of a web application, such as templating engines, and email service. Each hook around an interface is able to call rules implementing various detection (of attacks) and action (response to an attack) functions. For example, hooks are placed around the Database API (DBAPI) interface, and those hooks call functions (rules) to determine if the query string matches a SQL injection (attack) pattern.

The hooking mechanism is capable of working in cases where the runtime does not provide an instrumentation API. For example, the hooking mechanism may use "monkey patching" techniques or utilize a plugin/middleware mechanism provided by the language, framework or runtime of the particular application.

The present disclosure provides for these rules to be dynamic. That is, the code/logic implementing the detection/action functions (rules), which are in turn called by the hooks around particular interfaces, can be modified at runtime without intervention by the developer (user). These security functions of detection and/or defensive action are generated in the cloud service side of the platform, and delivered via a secure channel to the agent library, where they are implemented. Communication also flows in the other direction, from the agent library to the cloud service, and allows for the agent library to provide information about important events such as malicious users, threat level of site, database misconfiguration. This information can then be used for alerting the developer, or as factors into generating the detection or action functions dynamically. For example, a SQL injection detection function can be injected into a protected application via the cloud service. A generic malicious-user/session detection function can be enhanced over time by utilizing advanced algorithms using key application/user specific metrics (number of server faults generated in a time period, number of web requests in a time period, etc.), and pushed to the agent library to implement. This algorithm can be improved over time and the updates pushed to the agent library in real time, resulting in more accurate detection and protection without developer/operator/user intervention.

For example, a filter based on known-malicious-IP addresses or IP reputation, can be updated in real time as the cloud side learns about these malicious IPs and blocks application access to these IP addresses. These are only examples of filters, and are not a list of all possible filters.

A security function can be provided where an attacker sets off a trigger. For example, if there is an attempted SQL injection string, or a session modification attack, then extra logging for that user is performed and that user session is streamed to the cloud service for further inspection by the application developer or additional automated analysis is performed before deciding on denying the user application access.

A further example is the ability of the agent library to report to the cloud service about the different software components version information, e.g. libraries, frameworks, runtimes. The cloud service is then able to alert the developer of the application about known security issues relating to these software components, and where applicable, prevent known types of attacks against vulnerable components, for example, remote command execution attacks using object serialization features of certain web frameworks.

Finally, application configuration issues, such as database configuration, secure hash storage can be detected by custom functions that are generated by the cloud service and alerts sent to the application administrator/developer.

The system may or may not include a sandboxing mechanism to constrain the rules that may be executed. As an example, it may not be desirable to allow the rules to contain generic input/output operations, for security reasons, and to be restricted to computation algorithms only. As such, in an embodiment, the rules processor (or rules engines) disables all input/output operations such that rules or code injected into the web application cannot be compromised by a malicious agent to perform undesirable operations or export data. In other embodiments, the rules processor may selectively disable some operations (such as input/output operations) to sandbox the new rules injected into the web application.

The rules are executed by a rules engine (or rules processor), which places such constraints on the rules. This sandboxing effect can be achieved by use of a scripting engine, or alternatively, a full virtual machine and runtime environment with a restricted instruction set.

In accordance with an aspect of the present disclosure there is provided a system for protecting web applications against web attacks comprising a cloud service for generating rules and receiving reports, an agent manager in communication with the cloud service receiving rules from the cloud service and passing reports thereto, and an in-application agent in communication with the agent manager for receiving rules therefrom and passing reports thereto for protecting an application in which the in-application agent is embedded.

In accordance with another aspect of the present invention there is provided a method of protecting web applications against web attacks comprising the steps of embedding an in-application agent into a web application to be protected, generating rules in a cloud service, providing the rules generated to the in-application agent, the in-application agent, receiving rules for protecting the web application in which the in-application agent is embedded.

This summary is provided to highlight certain significant inventive aspects but is not intended to be an exhaustive or limiting definition of all inventive aspects of the disclosure. Other inventive aspects may be disclosed in the detailed description and drawings.

BRIEF DESCRIPTION OF THE DRAWINGS

The present invention will be further understood from the following detailed description with reference to the drawings in which:

FIG. 4 illustrates in a flowchart another method of protecting web applications in accordance with another embodiment of the present disclosure; and FIG. 5 illustrates in a flowchart another method of protecting web applications in accordance with another embodiment of the present disclosure.

DETAILED DESCRIPTION

The developer also has the ability to use the library functions to alert the cloud service about specific types of attacks that cannot be detected automatically, for example, a user session that skips a step in a multi-step process such as user signup. These types of alerts can be factored into determining a malicious user or malicious session.

Complicated policies can be built using generic detection functions, real-time threat intelligence information, application-specific developer customization—allowing for a highly effective method of detecting application level attacks in real time.

Furthermore, more than one application can be protected by the same set of policies (detection/action), managed by the same user interface, regardless of where the different applications reside.

Definitions:

A rule is a collection of detection logic (code), action logic (code) and associated data e.g., list of bad IPs, malicious users, vulnerable components, which are generated in the cloud service side of the system, and implemented by the agent library. A rule may be as simple as pattern-match-and-alert or as complicated as performing a statistical analysis on a request and streaming data to the cloud service for further processing.

A security policy is a collection of rules that define how the application is to detect and respond to cyber threats. Some policies may be computationally intensive but highly effective at detecting attacks, while others may be much less sophisticated initially, but raise the level of protection after an attacker is suspected.

A cloud service is a set of remote servers exposing an endpoint that collects relevant data from authenticated agent libraries via a secure channel, and generate policies and rules to be implemented by the agent library.

An agent library is a software component that is included by the developer into the application directly or by the runtime environment, that provides the base functionality on the agent side to receive and implement rules and policies, and is able to send requested information to the cloud service.

Figure 1:
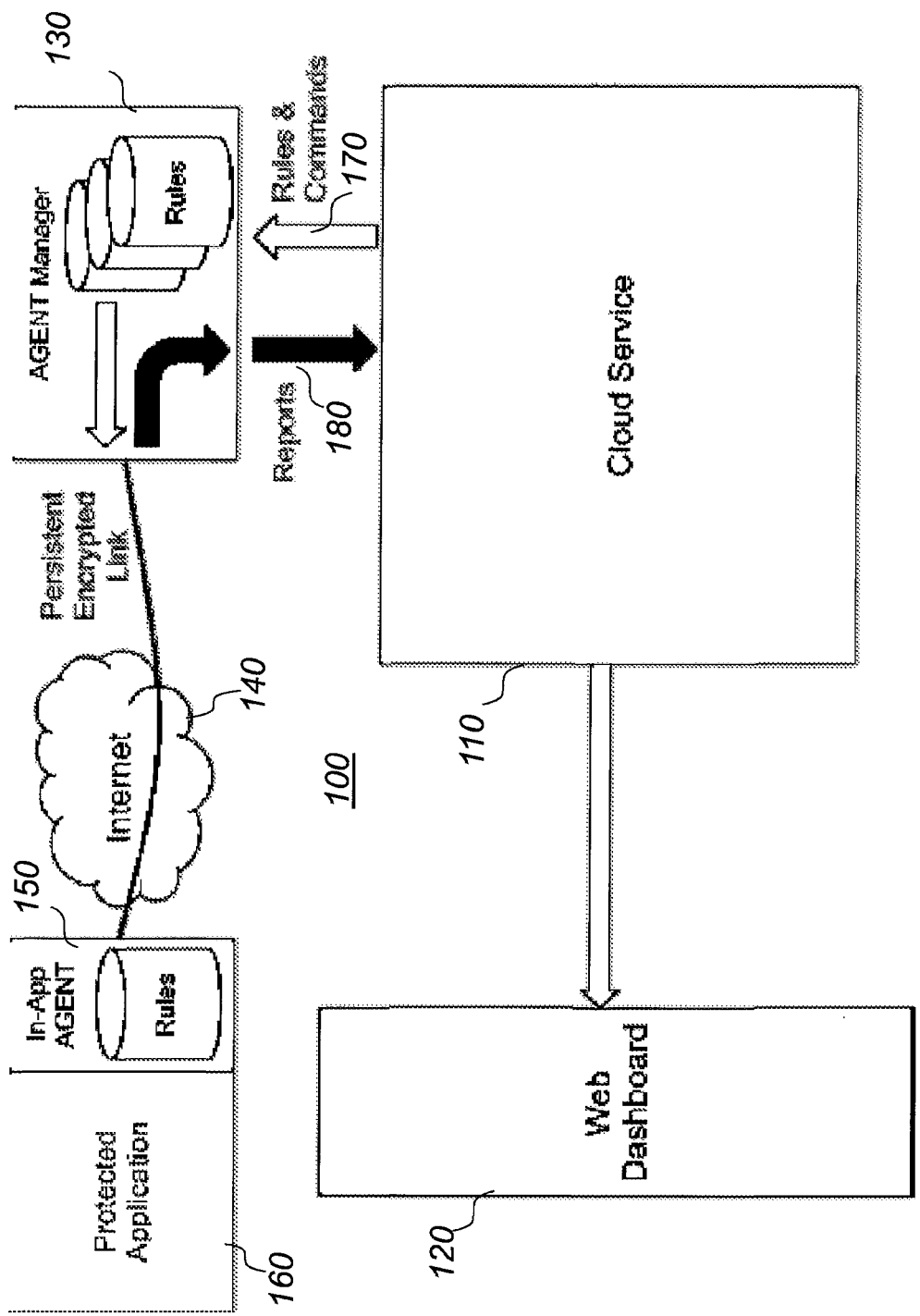
FIG. 1 illustrates a system for protecting web applications against web attacks in accordance with an embodiment of the present disclosure.

Referring to FIG. 1 there is illustrated a system for protecting web applications against web attacks in accordance with a first embodiment of the present disclosure. FIG. 1 provides an overview of the system components. The system 100 includes a cloud service 110 coupled to a real-time web dashboard 120 and in communication with an agent manager 130. The agent manager 130 communicates via the Internet 140 (e.g. via a persistent encrypted link) with an in-app agent 150 disposed in a protected application 160. The in-app agent 150 is either included as a library by the developer or may be injected into the protected application 160 via the runtime environment. For example, this may be done by wrapping the application or by injecting the library directly into the application via available runtime methods.

In operation, the in-app agent 150 receives rules 170 from the cloud service 110 via the agent manager 130. The rules 170 provide the detection and protection functionality. The in-app agent 150 also sends reports 180 to the agent manager 130. The agent manager 130 is responsible for the communications between the cloud service 110 and the protected application 160.

The real-time web dashboard 120 is provided to give the application developer or security operator an insight into the known vulnerabilities, attacks, and general state of security of the web application. The web dashboard 120 may display, present or output any suitable combination of data, metrics, information, settings, recommendations, etc. The real-time web dashboard 120 also provides a user interface having user interface elements (virtual buttons, menus, sliders, etc.) for customizing policies and rules.

The cloud service 110 receives the reports 180 from the various agent managers 130 (only one shown in FIG. 1), as well as from other external sources, for example third party threat intelligence feeds and new algorithms developed by security researchers and generates new rules to be deployed to the in-app agents 150 via the agent manager 130. In other words, the cloud service may dynamically update the rules based not only on the reports 180 but also based upon new threat information received from any external source.

Figure 2:
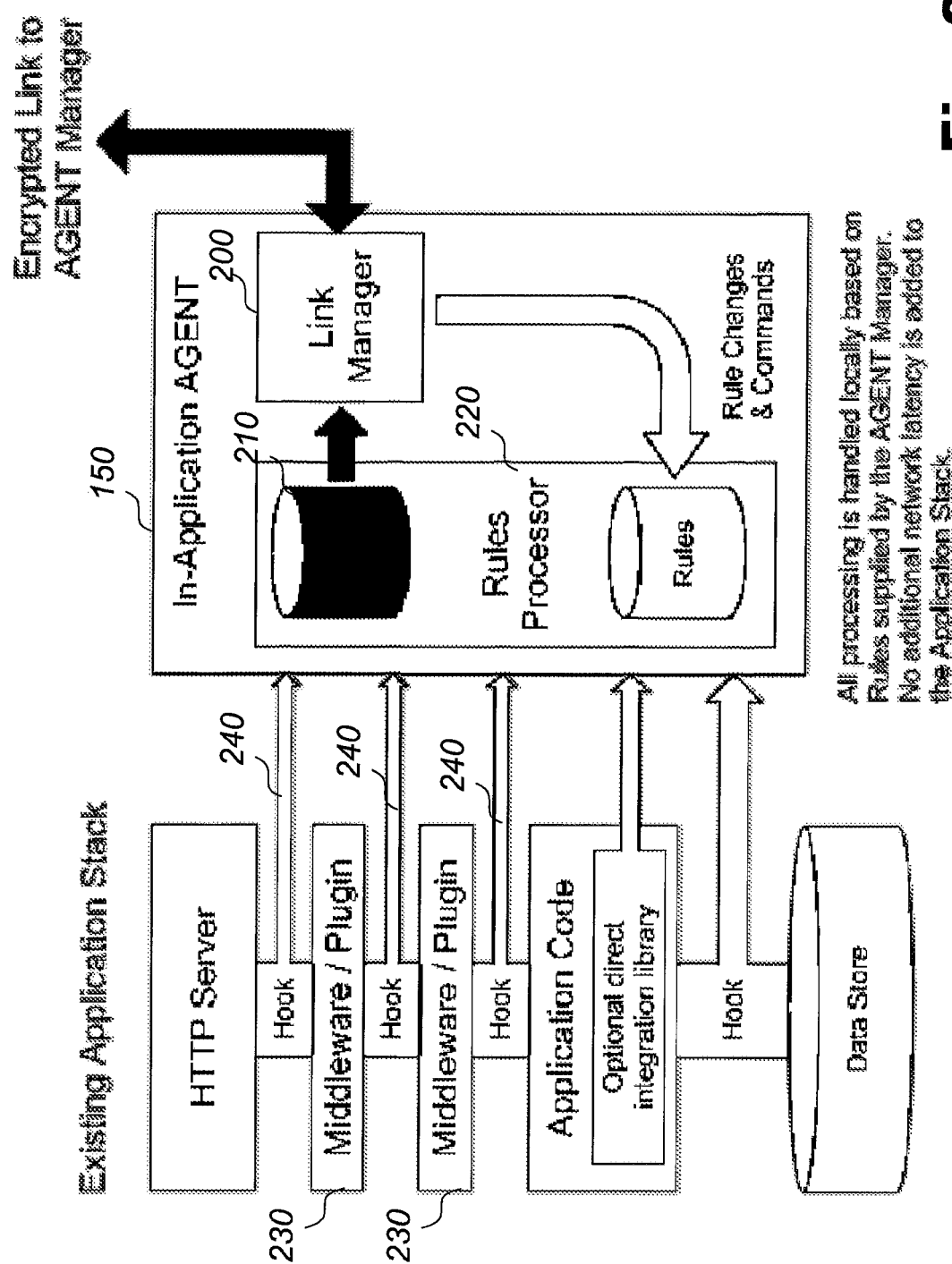
FIG. 2 illustrates the in-application agent of FIG. 1 in further detail.

Referring to FIG. 2, there is illustrated the in-app agent of FIG. 1 in further detail. FIG. 2 shows the components of the in-app agent 150. The in-app agent 150 includes a link manager 200, an in-app library 210 for storing the rules 170 and a rules processor 220 for applying rules 170 and generating reports 180.

In an example of the present disclosure, in operation, the agent library 210 uses a middleware mechanism 230 to hook into various points of the application 160 and the web application framework. The hooks 240 allow the rules processor 220 to inject rules 170 that it received from the cloud service 110 via the link manager 130 into these points in the program (web application) being protected. In turn, these rules 170 allow reports 180 to be generated by the rules processor 220 and to be sent by the in-app agent 150 back to the agent manager 130. The agent manager 130 forwards these reports 180 to the cloud service 110 for the creation of new rules in response to information contained within the reports.

Different rules 170 may be used for detecting session-tampering attacks, SQL injection attacks, HTTP parameter pollution attacks, and HTTP splitting attacks. These types of attacks are only some examples of the types of attacks that can be detected and thwarted using this invention.

FIG. 2 also shows an application stack having various hooks 240. All processing is handled locally based on the rules 170 supplied by the agent manager 130. No additional network latency is added to the application stack shown in FIG. 2.

Figure 3:
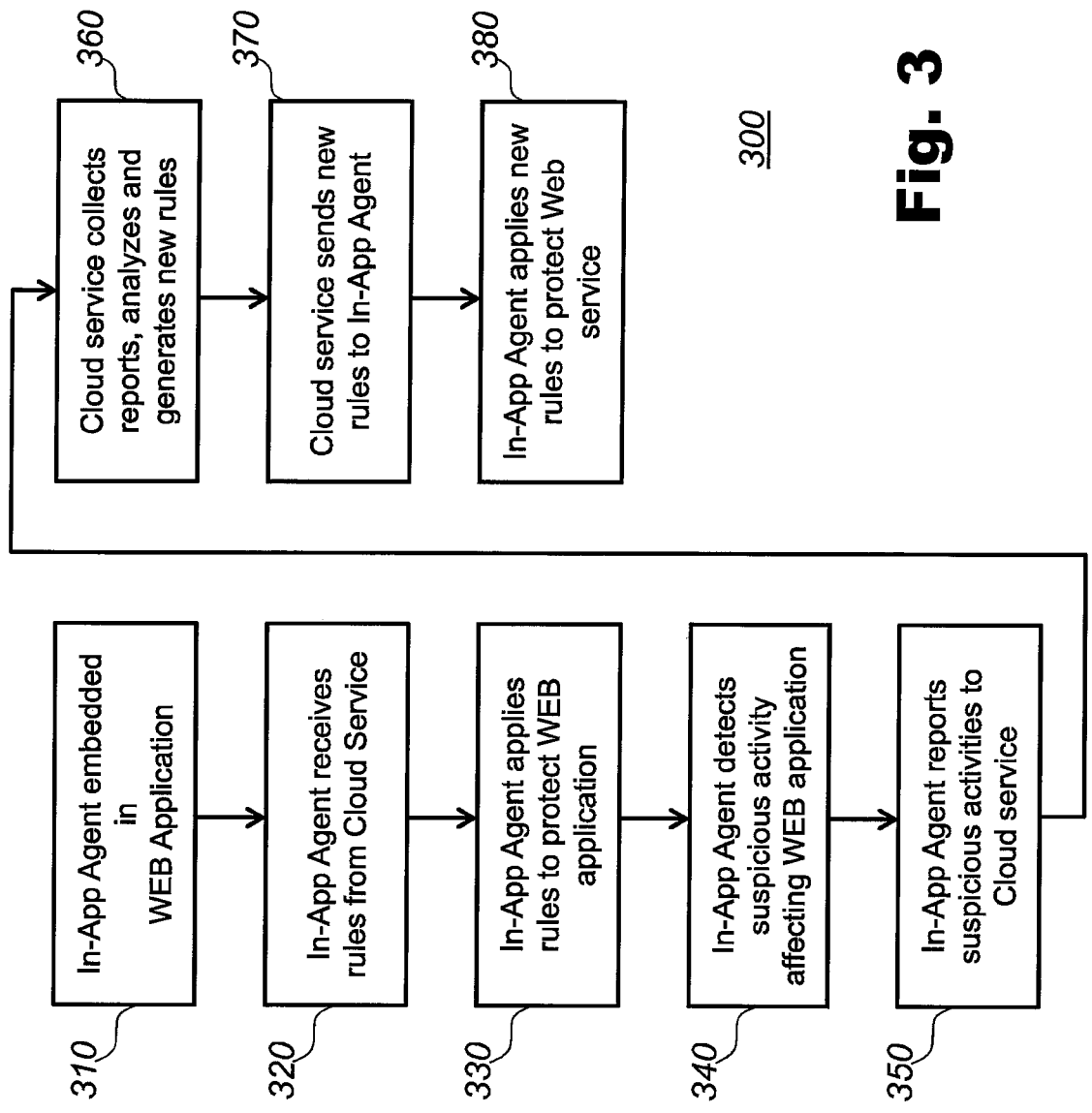
FIG. 3 illustrates in a flowchart a method of protecting web applications in accordance with another embodiment of the present disclosure.

Referring to FIG. 3 there is illustrated in a flowchart a method of protecting web applications in accordance with another embodiment of the present disclosure. The method 300 begins with embedding the in-app agent 150 at step 310. Once embedded, the in-app agent 150 receives rules from the cloud service 110, via the agent manager 130, at step 320. The in-app agent 150 then applies the rules to protect the web application using the rules 170 at step 330.

When the in-app agent 150 detects suspicious activity at step 340, it generates a report and sends it to the cloud service 110 via the agent manager 130 at step 350. The cloud service analyzes the report and generates new rules to deal with the suspicious activity at step 360 and sends the new rules to the in-app agent 150, via the agent manager 130, at step 370. Finally, the in-app agent applies the new rules to deal with the suspicious activity at step 380. This example represents a reactive situation.

Referring to FIG. 4 there is illustrated in a flowchart a method of protecting web applications in accordance with a further embodiment of the present disclosure. The method 400 begins with embedding the in-app agent 150 at step 410. Once embedded, the in-app agent 150 receives rules from the cloud service 110, via the agent manager 130, at step 420. The in-app agent 150 then applies the rules to protect the web application using the rules 170 at 430. The cloud service 110 receives new information at step 440. In this scenario there is no tripwire event in the in-app agent, rather, there is an update to the rules (step 450) because of an improvement in the rule set, which could be a better algorithm, data external to the application (e.g., IP reputation, vulnerable library information). In this case, the flow is straight from the cloud service to the agent (step 460). Finally, the in-app agent applies the new rules to protect the web application in an enhanced way at step 470. This example represents a proactive situation in which the cloud service 110 initializes the improved protection provided to the web application by the in-app agent.

The dynamic nature of the method provides for altering the protection algorithms used based on what the cloud service 110 believes is most effective. Consequently, the cloud service is injecting code for new algorithms into the in-app agents, which changes how attacks are detected/stopped all without developer intervention. Thus the in-app agent provides an empty container of rules at certain interfaces within the application, to be filled with rules that are generated dynamically cloud-side.

Referring to FIG. 5 there is illustrated in a flowchart further detail of the operation of the in-app agent 150. The operation 500 begins with embedding the in-app agent 150 as represented by block 510. The web application is started at block 520. The In-App Agent 150 technology injects hooks into the various interfaces: for example, it injects code (a hook) into the database interface layer (DB API) that allows it to process requests before the DB API call is made at block 530. The In-App agent 150 inserts default rules into these interfaces at block 530. The In-App agent 150 requests an updated rule set for these interfaces at block 540. The In-App agent 150 receives the rules from cloud service 110. Finally, the in-app agent 150 applies the new rules to protect the web application in an enhanced way, as represented by block 570.

Although the foregoing technology is best implemented using a cloud service 110, in other embodiments the cloud service may be replaced by a server cluster or even a single server. Each server is a computing device having a processor coupled to a memory and to a data communication port (e.g. modem, network adapter, etc.) for data communication with a network to which the server is connected. The server may include various input/output (I/O) devices and peripherals. The processor and memory cooperate to execute instructions in the form of software code for causing the computing device (server, cluster or cloud service as the case may be) to perform the acts or operations of the novel methods described herein.

Any of the methods disclosed herein may be implemented in hardware, software, firmware or any combination thereof. Where implemented as software, the method steps, acts or operations may be programmed or coded as computer-readable instructions and recorded electronically, magnetically or optically on a non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means, memory device or medium that contains, records, or stores a computer program or application to be executed or run by a processor (or microprocessor) of a computer (or computing device or other instruction-execution apparatus). The computer-readable medium may be electronic, magnetic, optical, electromagnetic, infrared or any semiconductor system or device. For example, computer executable code to perform the methods disclosed herein may be tangibly recorded on a non-transitory computer-readable medium including, but not limited to, a floppy-disk, a CD-ROM, a DVD, RAM, ROM, EPROM, Flash Memory or any suitable memory card, etc. The method may also be at least partially implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A system for protecting a web application against a web attack, the system comprising:
   an in-application agent comprising a separate module which includes an in-application library for storing rules and a rules processor for applying rules for protecting the web application in which the in-application agent is embedded and for generating reports of suspicious activity, wherein the web application with the in-application agent embedded therein runs on a remote server comprising a computing device having a processor coupled to a memory and to a data communication port;
   a cloud service running on a set of remote servers for providing rules, receiving the reports and generating new rules in response to the reports received without user intervention in the in-application agent; and
   an agent manager in communication with the cloud service for receiving the rules from the cloud service and passing the rules received to the in-application agent and for receiving the reports from the in-application agent and passing the reports received to the cloud service,
   wherein the cloud service is configured to enhance a generic detection rule over time using a number of server faults generated over a first time period and a number of web requests in a second time period and push the enhanced rule to the in-application library in real time.

2. The system of claim 1, wherein the rules are called by hooks around interfaces between the web application and a runtime environment.

3. The system of claim 2, wherein code implementing the rules called by the hooks is modified at runtime without user intervention.

4. The system of claim 1, wherein the cloud service dynamically updates the rules based upon new threat information received from an external source.

5. The system of claim 1, wherein the in-application agent includes a link manager for communications with the agent manager.

6. The system of claim 1 wherein the cloud service generates and updates rules in response to both application-level and external data sources.

7. The system of claim 1 wherein, upon receiving the new rules, the in-application agent updates a web protection configuration to use the new rules.

8. The system of claim 1 wherein the in-application agent processes the rules locally to detect and respond to a threat.

9. A method of protecting a web application against a web attack, the method comprising:
   embedding an in-application agent comprising a separate module into the web application to be protected, wherein the web application with the in-application agent embedded therein runs on a remote server comprising a computing device having a processor coupled to a memory and to a data communication port;
   generating rules in a cloud service running on a set of remote servers;
   providing, by an agent manager, the rules generated by the cloud service to the in-application agent;
   storing, by an in-application library of the in-application agent, the rules received from the agent manager;
   applying, by the in-application agent, the rules to protect the web application in which the in-application agent is embedded; and
   enhancing a generic detection rule over time by the cloud service using a number of server faults generated over a first time period and a number of web requests in a second time period; and
   pushing the enhanced rule by the cloud service to the in-application library in real time.

10. The method of claim 9 further comprising:
    calling the rules by hooks around interfaces between the web application and a runtime environment.

11. The method of claim 10, wherein code implementing the rules called by the hooks is modified at runtime without user intervention.

12. The method of claim 9 further comprising:
    detecting suspicious activity by the in-application agent;
    generating a report;
    sending the report from the in-application agent to the agent manager; and
    sending the report from the agent manager to the cloud service.

13. The method of claim 12 further comprising, upon receiving the report at the cloud service:
    generating a new rule; and
    sending the new rule to the in-application agent via the agent manager.

14. The method of claim 9 further comprising:
    receiving new threat information at the cloud service from an external source;
    generating new rules; and
    sending the new rules to the in-application agent via the agent manager; and
    the in-application agent using the new rules to protect against a new threat.

15. A non-transitory computer readable medium comprising instructions in code which when stored in a memory of a computing device and executed by a processor of the computing device cause the computing device to:
    execute an in-application agent comprising a separate module embedded in a web application, the in-application agent including:
    an in-application library for storing rules;
    a rules processor for applying the rules and for generating one or more reports; and
    a link manager for receiving new rules from a cloud service generated in response to the one or more reports, wherein the rules are called by one or more hooks around interfaces between the web application and a runtime environment, wherein code implementing the rules is modified at runtime without user intervention, and wherein the cloud service is configured to enhance a generic detection rule over time using a number of server faults generated over a first time period and a number of web requests in a second time period and push the enhanced rule to the in-application library in real time.

16. The computer readable medium of claim 15, wherein the link manager communicates with the cloud service by communicating via an encrypted link with an agent manager.

17. The computer readable medium of claim 15, wherein the rules processor disables input/output operations to sandbox the new rules injected into the web application.

* * * * *